United States Patent
Baratta

(10) Patent No.: US 7,214,007 B2
(45) Date of Patent: May 8, 2007

(54) COMPOSITE TRACK, COLUMN AND OTHER SUPPORTS, INCLUDING FOR MACHINERY

(75) Inventor: Anthony Baratta, Oak Park, CA (US)

(73) Assignee: Husqvarna Outdoor Products Inc., Augusta, GA (US)

( * ) Notice: Subject to any disclaimer, the term of this patent is extended or adjusted under 35 U.S.C. 154(b) by 550 days.

(21) Appl. No.: 10/358,072

(22) Filed: Feb. 3, 2003

(65) Prior Publication Data

US 2004/0151552 A1   Aug. 5, 2004

(51) Int. Cl.
 *B23B 47/00* (2006.01)
(52) U.S. Cl. .................. 408/111; 83/745; 248/651; 248/674; 408/135; 408/234; 428/188
(58) Field of Classification Search ........... 408/110, 408/111, 135, 136, 234; 409/235; 248/637, 248/651, 656, 674, 678, 679; 428/178, 188; 52/793.1; 83/745; 175/220
See application file for complete search history.

(56) References Cited

U.S. PATENT DOCUMENTS

| | | | | |
|---|---|---|---|---|
| 3,412,813 A | * | 11/1968 | Johnson | 173/141 |
| 3,800,636 A | * | 4/1974 | Zagar | 82/149 |
| 4,320,887 A | * | 3/1982 | Destree | 248/651 |
| 4,522,098 A | * | 6/1985 | Bliss | 83/745 |
| 4,826,127 A | * | 5/1989 | Koblischek et al. | 248/679 |
| 5,118,555 A | * | 6/1992 | Horovitz | 428/178 |
| 5,183,374 A | * | 2/1993 | Line | 409/286 |
| 5,799,924 A | * | 9/1998 | Slocum et al. | 248/636 |
| 6,309,148 B1 | * | 10/2001 | Wang | 408/87 |
| 6,519,823 B1 | * | 2/2003 | Sugata et al. | 29/26 A |
| 2003/0096096 A1 | | 5/2003 | Jo et al. | |
| 2004/0009338 A1 | | 1/2004 | Jo et al. | |
| 2005/0061128 A1 | * | 3/2005 | Caughlin et al. | 83/574 |
| 2005/0214084 A1 | | 9/2005 | Baratta et al. | |

FOREIGN PATENT DOCUMENTS

| | | | | |
|---|---|---|---|---|
| DE | 1925208 B | * | 2/1978 | |
| DE | 3408457 A1 | * | 9/1985 | |
| DE | 10064173 C1 | * | 6/2002 | |
| GB | 2095143 A | * | 9/1982 | |
| JP | 58102638 A | * | 6/1983 | |
| JP | 59124533 A | * | 7/1984 | |
| JP | 08224726 A | * | 9/1996 | |
| JP | 09123158 A | * | 5/1997 | |
| JP | 09300115 A | * | 11/1997 | |

OTHER PUBLICATIONS

DIMAS, Instruction Manual Drill Stand Model 42N, Operation, Maintenance, Parts; 1994.

* cited by examiner

*Primary Examiner*—Daniel W. Howell
(74) *Attorney, Agent, or Firm*—Henricks, Slavin & Holmes

(57) ABSTRACT

A drill assembly, for example for drilling or coring concrete, has a drill column formed from a composite material. A track for a wall saw or for supporting other structures for movement along the track is formed from a composite material. A composite column, rail or other longitudinally extending composite structure having a hollow interior portion includes an internal support structure.

54 Claims, 13 Drawing Sheets

COMPOSITE TRACK, COLUMN AND OTHER SUPPORTS, INCLUDING FOR MACHINERY

BACKGROUND

1. Field of the Inventions

The present disclosure relates to machining equipment, including that used on concrete, masonry and other materials, and including drill assemblies, wall saws, and flat saws. The present disclosure also relates to composite structures.

2. Related Art

Equipment used to machine work pieces, including movable and individual work pieces as well as fixed surfaces or structures, are generally strong and durable to ensure precise and accurate machining of the work piece. Often, the equipment is relatively heavy to ensure that the equipment does not move during operation, thereby helping to assure precision and accuracy. Where the work piece is a fixed surface or structure, in other words immovable, which is typically the case for concrete structures, the equipment is transported to the work piece and setup for operating on work piece.

Portable machining equipment is often formed from steel and other components that have high strength, durability and resistance to large loads and stresses. These steel and other components add significant weight to the equipment, and they are often broken down into pieces or sub-components and carried separately to job sites. They are then re-assembled for use and then broken down again to be removed from the job site.

SUMMARY

Components and equipment used for machining work pieces are made lighter with composite materials. Such components may include columns, tracks, rails and other structures previously made from steel and other metals. Components made from composite materials may be strengthened by providing inserts.

In one example disclosed herein, a drill assembly includes a support base and a drill column supported by the base wherein the drill column is formed from a composite material. In one example, the composite material includes carbon fibers, and in another example the composite material includes glass fibers. In one form, the composite material is formed principally from carbon fibers with glass fibers exterior to the carbon fibers.

In a drill assembly that includes a support base and a composite drill column, one or more plates are included on the outside of the drill column. The plate may be a steel plate, and may be bonded to the outside of the column. Steel plates may be used as bearing surfaces for supporting one or more rollers on a housing that travels along the column. A plate may also include an engagement surface such as a rack.

In a drill assembly that includes a composite drill column, the drill column may have a rectangular cross-section and a hollow interior portion containing a supporting insert. The insert may be foam, such as a closed-cell foam, a honey comb material formed from a polymeric substance or a metal, plastic or composite structure, for example a carbon fiber and/or glass fiber composite. A composite insert may have the same shape as the outer shape of the drill column or a different shape, and may have the same shape as the hollow interior portion or a different shape. In one example, the drill column has a rectangular cross-sectional shape and an insert has the same shape. The rectangular insert can contact the interior wall of the drill column over a substantial surface of the facing wall or walls of the insert, or over a small surface. For example, the entire surface of one side of the insert can contact the adjacent surface of the drill column. In another example, a corner surface of the insert can contact the adjacent surface of the drill column. In a further example, a plurality of inserts may be positioned within the hollow portion of the drill column in such a way that substantially all of the hollow surface is contacted by an adjacent surface of insert. In a square drill column having a square hollow interior, four smaller square inserts can occupy the entire hollow interior, with each insert having a wall contacting the adjacent wall of the column, such as through an appropriate bonding agent, glue or other adhesive. Additionally, in a square drill column having a square hollow interior, a circular insert touches adjacent walls of a hollow interior surface at four tangent points, or a square insert can touch each of its four corners to mid points of the adjacent column walls.

In another example of a composite material being used with equipment for working on a work piece, a track for a wall saw has a rail formed from a carbon fiber composite with a hollow portion and a support structure extending within the hollow portion. In one example, a wall of the support structure contacts a wall of the hollow portion, and may be bonded to the wall of the hollow portion through an adhesive, glue or other bonding material. One or more plates may be placed on respective surfaces of the rail, and a rack or other engagement structure may also be placed on the rail.

In an example of a track or rail for a wall saw or other piece of equipment, the track may have a first shape and the insert may have the same shape or a different shape. The insert can be a foam, honey comb material or a composite structure, for example a carbon fiber and/or glass fiber composite. The composite insert may have the same shape has the track or a different shape, and in one example, the track has a hollow rectangular cross-section and the structural support is also rectangular. The rectangular support can contact the interior wall of the track over a substantial surface of the facing wall or walls of the rectangular support, or over a small surface. A plurality of supports may be positioned within the hollow portion, and may be configured so that substantially all of the hollow surface is contacted by an adjacent surface of the support. A circular support structure may contact adjacent walls of the hollow interior surface, for example at four tangent points, or a square support structure can touch each of its four corners to mid points of the adjacent track walls. Other configurations are possible.

A composite structure for supporting other structures includes a first fiber reinforced structure having a hollow interior portion and a second structure extending within the hollow portion. The second structure contacts an inside surface of the hollow interior portion. In one example, the second structure may also be a composite, such as a fiber reinforced structure. In another example, the second structure contacts the inside surface of the hollow portion at a point adjacent an outside surface of the first structure against which a force or load is applied, such as through a bearing, load member or other means. Where a load is applied to the outside surface, a bearing plate or other bearing surface may be applied to the first structure to help support the load. The first and second supports may have the same shape or different shapes, and in one example, the first support is a hollow rectangular structure and the second support is also rectangular, and preferably hollow. The rectangular second support can contact the interior wall of the rectangular first support over a substantial surface of the facing wall or walls of the second rectangular support, or over a small surface. A plurality of second supports may be positioned within the hollow portion of the first support, and may be configured so that substantially all of the hollow surface is contacted by respective adjacent surfaces of the second supports. The second support may be circular and may contact the hollow interior surface of the first support, for example at four tangent points, or it may be a square support structure contacting the interior portion of hollow surface at its four corners to mid points of the adjacent walls of the first support.

These and other aspects will be considered in more detail in conjunction with the drawings, a brief description of which follows, and the detailed description.

DETAILED DESCRIPTION

Figure 1:
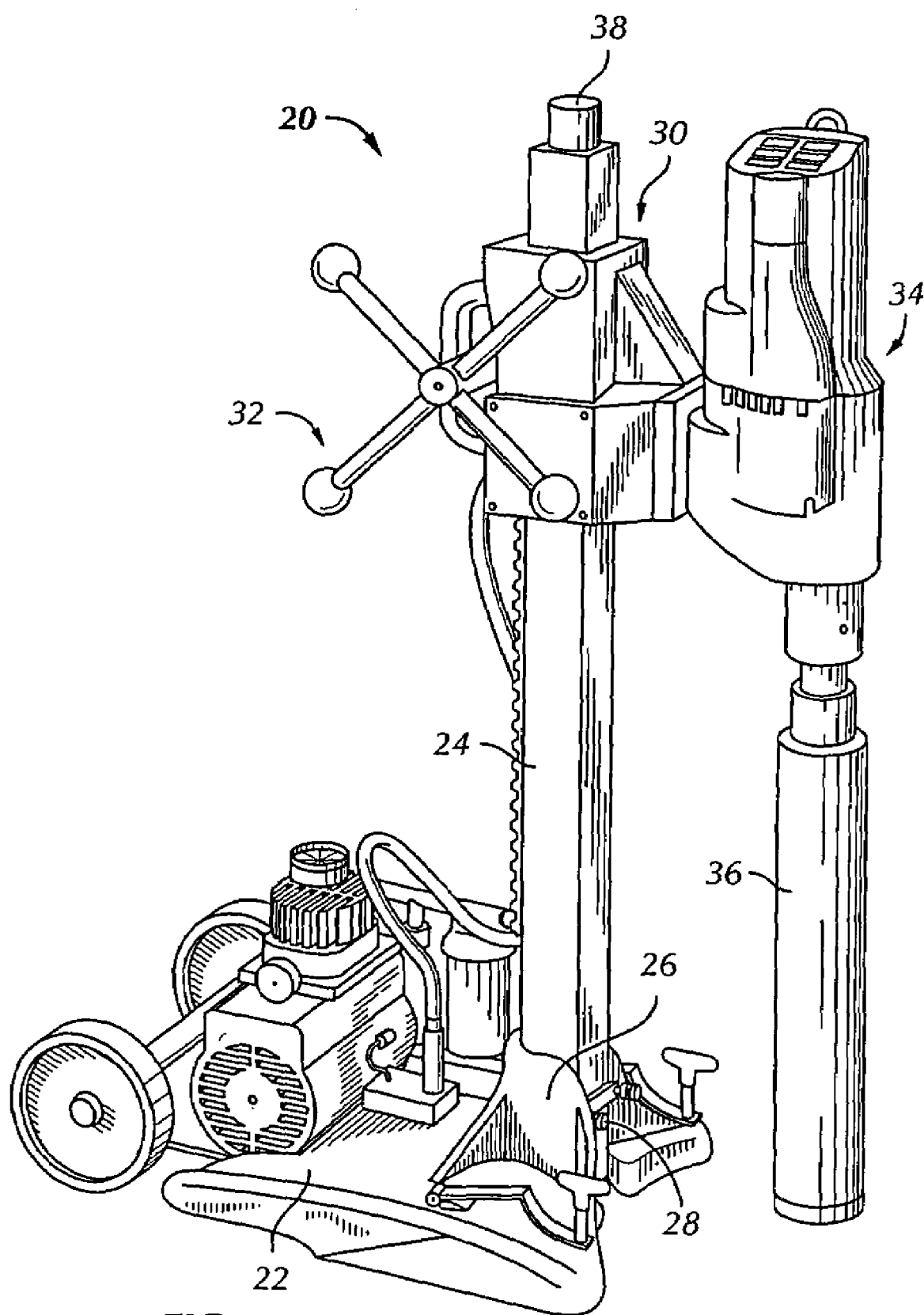
FIG. 1 is an isometric view of a machining device in the form of a concrete drill with which a composite column can be used.

The following specification taken in conjunction with the drawings sets forth the examples of the present inventions in such a manner that any person skilled in the art can make and use the inventions. The examples of the inventions disclosed herein are the best modes contemplated by the inventor for carrying out the inventions in a commercial environment, although it should be understood that various modifications can be accomplished within the parameters of the present inventions.

The descriptions herein are directed to several examples of machining devices, as well as to examples of composite structures for supporting devices. The examples include a drill column for a concrete drill and a track for a wall saw, as well as examples of composite structures used as columns and rails, but one or more aspects of these examples can be incorporated into other apparatus and designs.

In one example of a machining device (FIG. 1), a concrete drill 20 includes a support base 22 for accepting or receiving a drill column 24 in a mounting bracket 26. One or more bolts 28 secure the drill column within the mounting bracket 26 in a manner conventional with the drill stands such as that shown in FIG. 1. A drill support in the form of a carriage 30 extends about the drill column and moves along the drill column through rotation of the handle 32. The carriage supports a drill motor 34, which drives a bit or coring device 36. A jack screw 38 is threaded into the top of the drill column 24, to allow bracing of the drill column against an overhead support, such as a beam, ceiling or other structure, possibly through one or more spacers (not shown).

Figure 2:
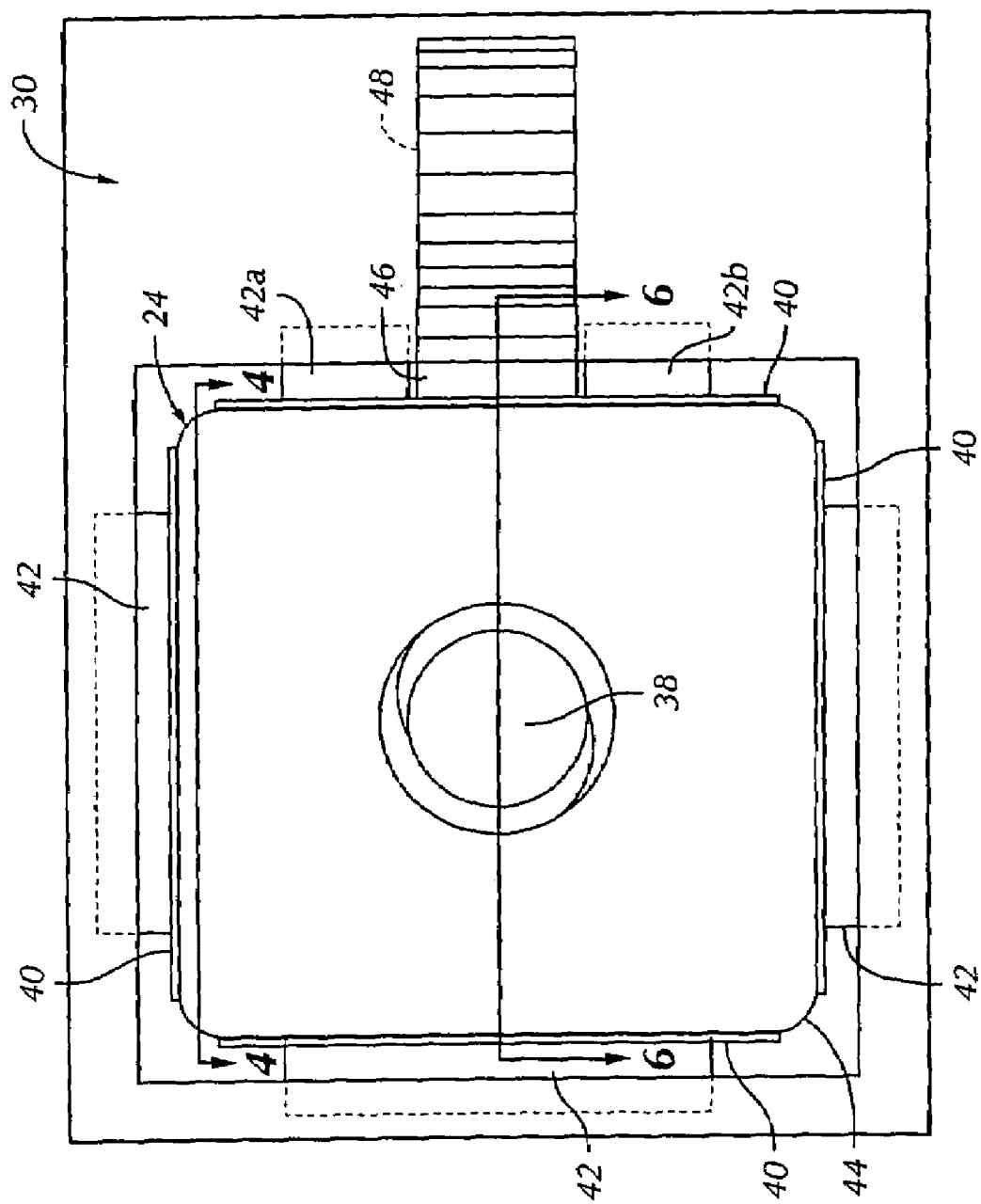
FIG. 2 is a top plan view of the composite column and part of a housing used for carrying a drill such as that shown in FIG. 1.
Figure 3:
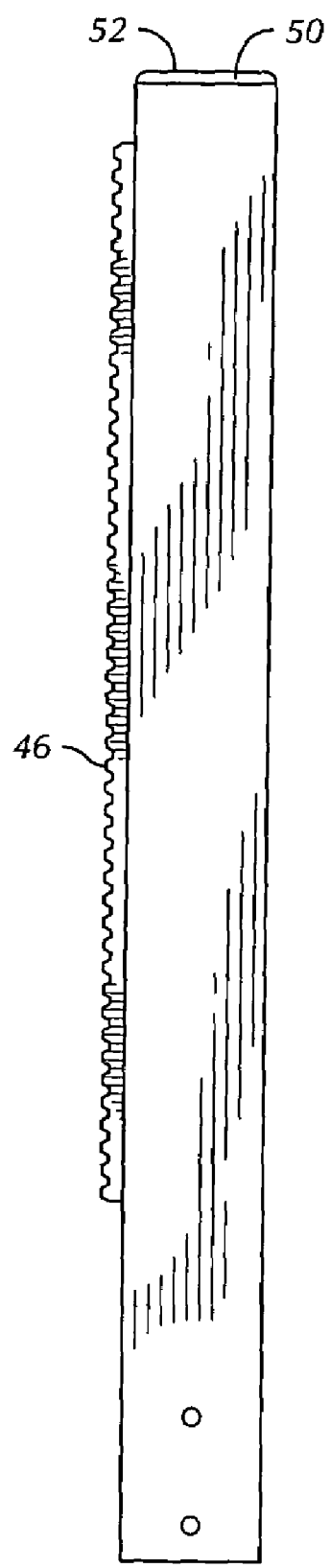
FIG. 3 is a side elevation view of the column of FIG. 1.

The column 24 includes one or more surfaces or plates in the form of bearing plates 40 (FIG. 2) for receiving and distributing loads applied to the column through the carriage 30, for example through bearings or rollers 42 housed within the carriage 30. The rollers are preferably elongated, and there are two upper rollers and two lower rollers on each side. Alternatively, where space permits, a single roller can be used, extending over half the width of the column. A set of rollers is placed at the upper portion of the carriage 30 and another set is placed at the lower portion of the carriage 30. One pair of rollers on one side may be replaced by an eccentric roller allowing for adjustment over time to accommodate for wear, and a pair of rollers on an adjacent side may also be replaced by an eccentric roller, to allow for adjustment on two sides.

Figure 9:
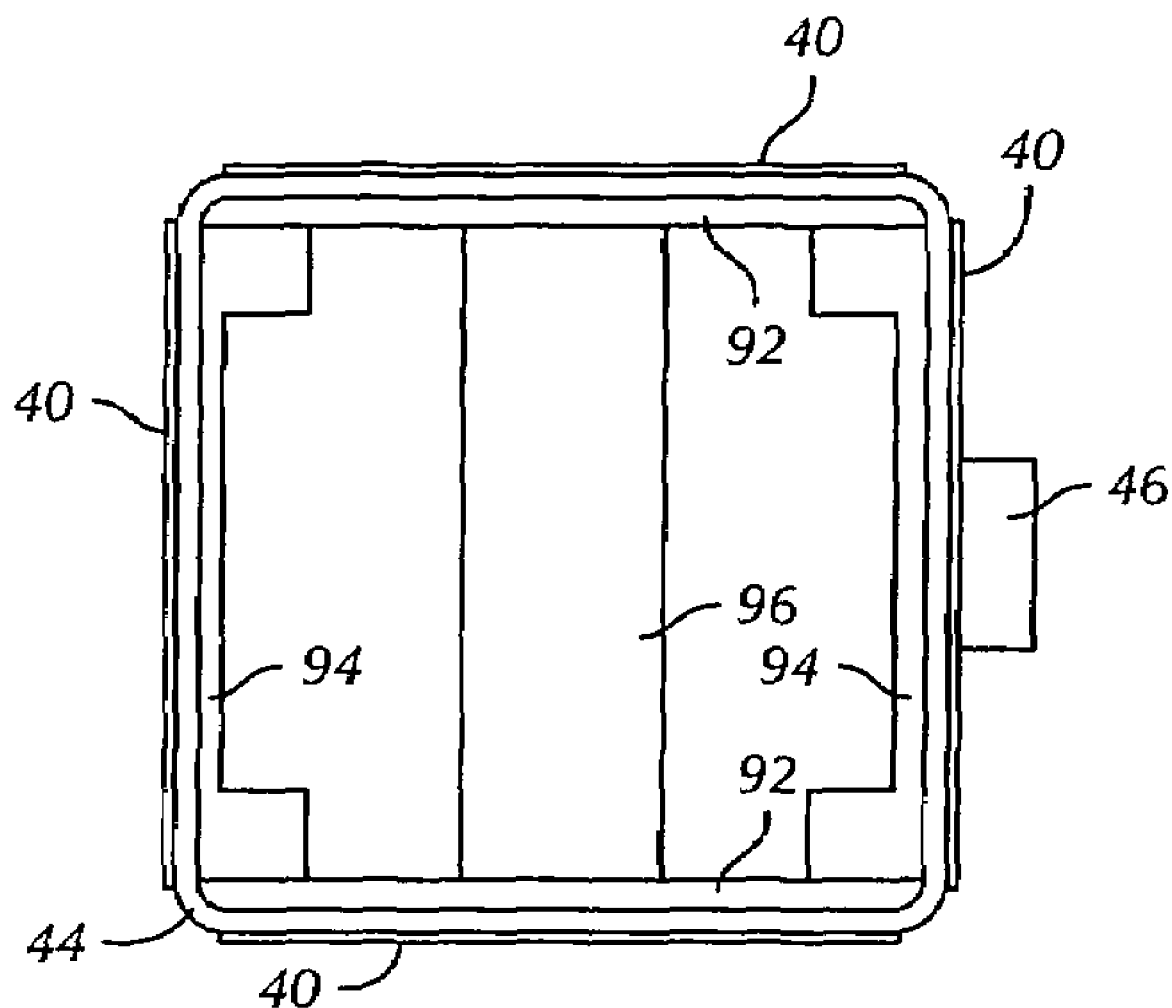
FIG. 9 is a bottom plan view of the drill column of FIG. 1.
Figure 9A:
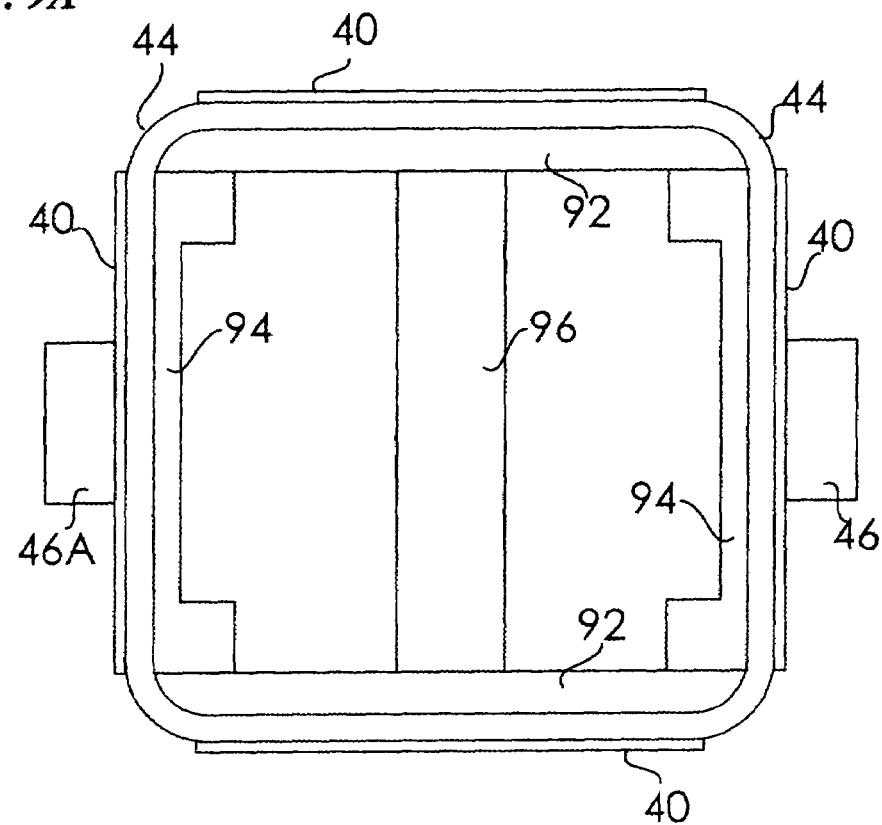

The plates 40 also help to accommodate and distribute loads in the column through the base 22 as result of the coring or drilling operation. The plates may be approximately 0.018 inch thick stainless-steel, or other material having a suitable strength and thickness, and the thickness and width of a given plate may be somewhat inversely proportional to the width of a roller. The plates 40 are preferably bonded, adhered or otherwise fixed to a cylindrical column 44 through appropriate glue or adhesive, for example an epoxy. Each preferably extends the entire length of the cylindrical column 44 and the width of the respective face of the cylindrical column 44, terminating in the example shown in FIG. 2 before the curve in each side of the cylindrical column, for example allowing a half-inch radius at the corner. One of the bearing plates supports a rack 46 fixed, bonded, welded or otherwise securely supported on the bearing plates to allow the carriage 30 to move along the column through a gear 48 turning with the handle 32. The gear 48 may be a worm gear to more reliably control the position of the carriage 30 on the drill column 24. The carriage is supported on each side of the rack 46 through smaller bearings 42A and 42B. A second rack 46A (FIG. 9A) may be included.

A top end plate 50 (FIGS. 3–7) closes the top end of the cylindrical column 44. The top end plate 50 transmits any axial loading from the jack screw 38 longitudinally along the cylindrical column 44. The top end plate includes a top surface 52 extending transversely to a rim or ledge 54, the underside of which bears against the end face of the cylindrical column 44. An axially extending wall 56 is position inward under the rim 54 to closely fit within the opening of the cylindrical column 44. The top end plate may be formed from steel or other strong metal capable of withstanding the axial loads applied through the jack screw 38. A nut 58 is welded to the underside of the top end plate 50 for threading the jack screw 38. The top end plate 50 is secured in the end of the cylindrical column 44 through a layer of glue or other bonding agent, for example epoxy, shown schematically at 60 in FIG. 5. The layer of glue 60 is applied between the circumferential surface of the wall 56 and the corresponding internal surface of the cylindrical column 44.

Figure 4:
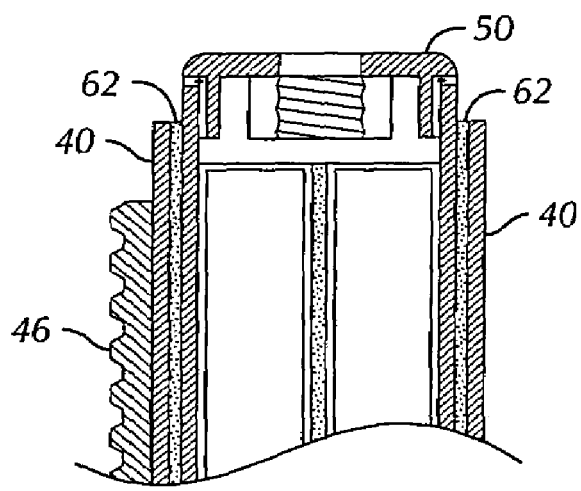
FIG. 4 is a longitudinal cross-section of the drill column of FIG. 3 taken along lines 4—4 of FIG. 2.
Figure 4:
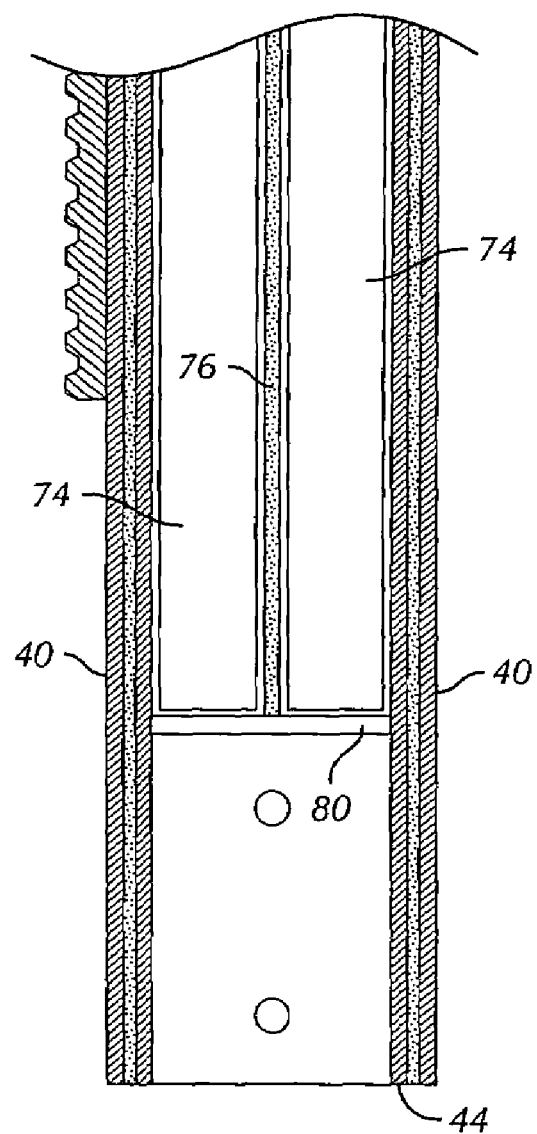
Figure 5:
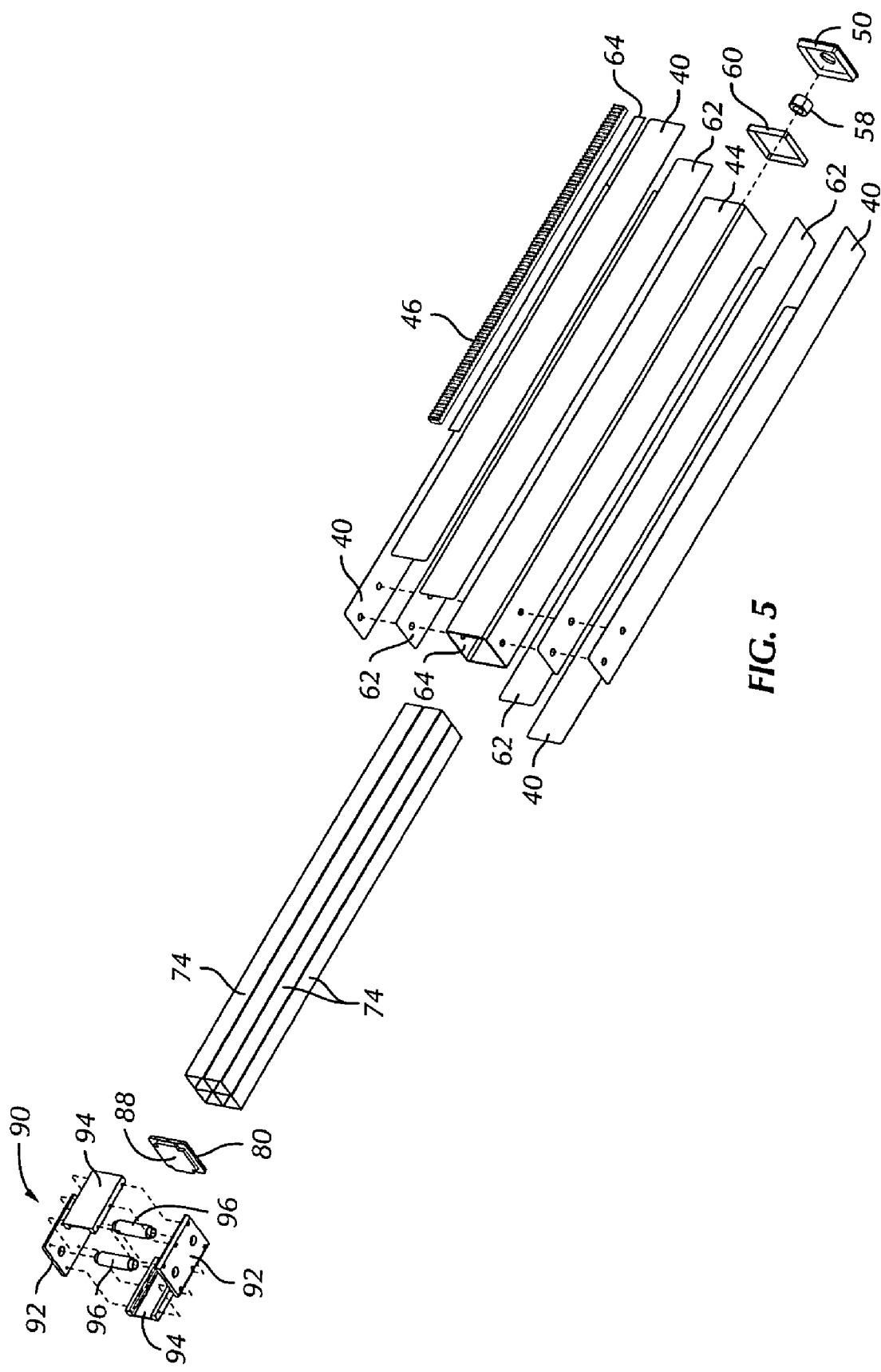
FIG. 5 is an exploded view of most of the components of the drill column of FIG. 1.
Figure 6:
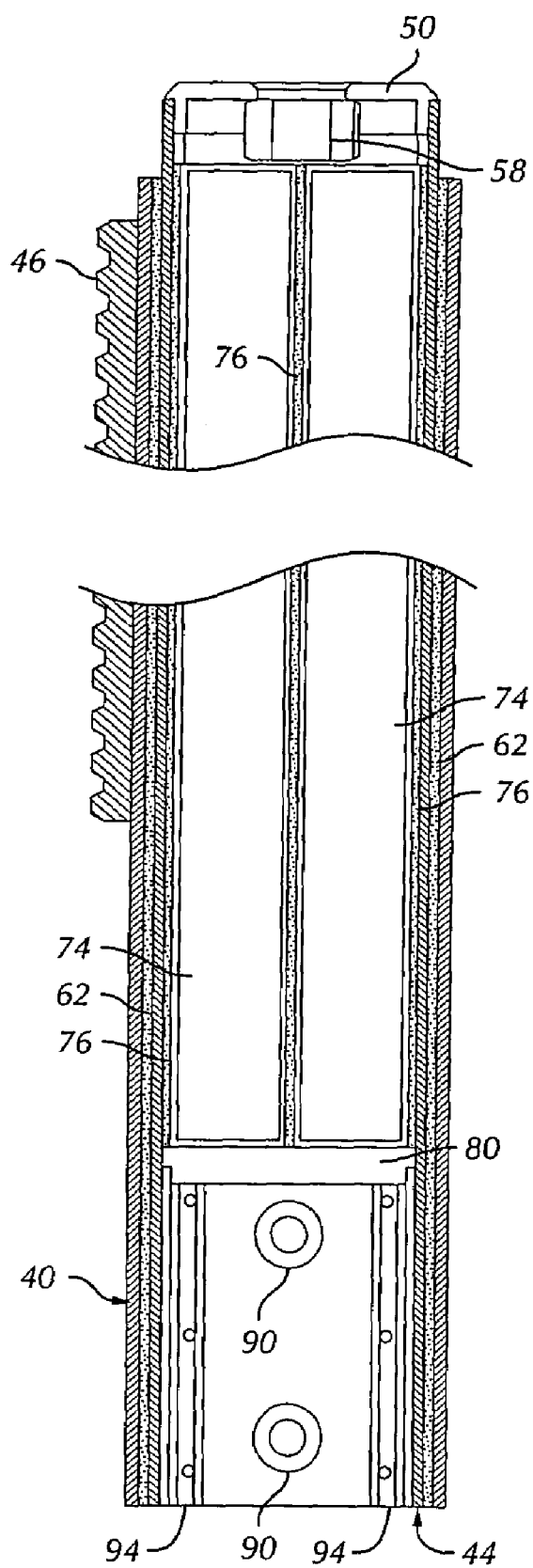
FIG. 6 is a longitudinal cross-section of the drill column of FIG. 3 similar to that of FIG. 4 but taken along the central longitudinal axis of drill column, along lines 6—6 of FIG. 2 (adhesive layers not shown).
Figure 7:
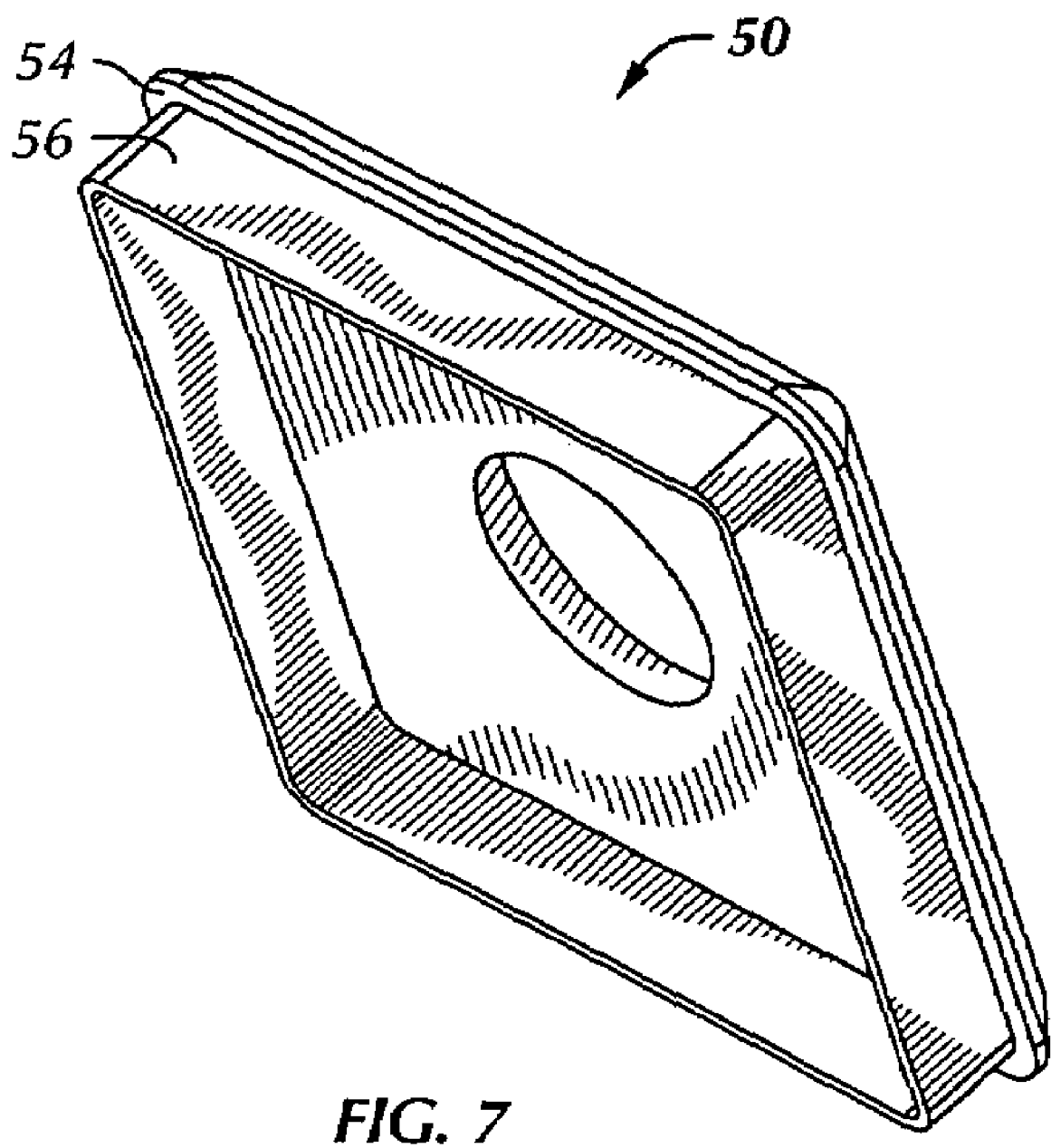
FIG. 7 is a lower isometric view of a top cap for use with the drill column of FIG. 1.

Considering the drill column 24 in more detail with respect to FIGS. 4–6, the plates 40 are preferably steel plates bonded through respective epoxy layers 62 to the underlying outer surfaces of the cylindrical column 44. For a cylindrical column supporting the carriage 30 having rollers 42 around all four sides, the cylindrical column includes a steel plate on each of the four sides of the column fixed in place by respective epoxy layers 62. A bonding layer 64 is shown in FIG. 5 for fixing the rack 46 to the underlying steel plate 40.

The cylindrical column 44 is formed as a composite of carbon fiber within a resin matrix, wherein the carbon fibers are wound at selected angles with multiple layers of pre-impregnated carbon filaments. The fiber orientation is selected according to desired criteria for withstanding possible torsion, bending or compression loads that may occur in the device. The number of windings may vary, but the present example uses about 12 layers, some of which are oriented at about 45 degrees for withstanding torsion, zero degrees for compression and 0–10 degrees for bending or stiffness. The composite column 44 is made in a manner conventional for facilities that manufacture components of composite materials. One example of companies making composite materials is Composite Tek, of Boulder, Colo., and possible techniques and configurations for components describe herein can be found in their Composites Design Guide, Revision 2, incorporated herein by reference. A layer of glass fibers is also incorporated on the outside of the carbon fiber layers to insulate the carbon fiber layers from expansion and contraction that may occur in the steel plates, and also to protect against galvanic action. The composite column has a low moment of inertia, and can replace conventional steel columns. The composite column can have thinner walls for similar loads, and has significantly lighter weight.

Figure 11:
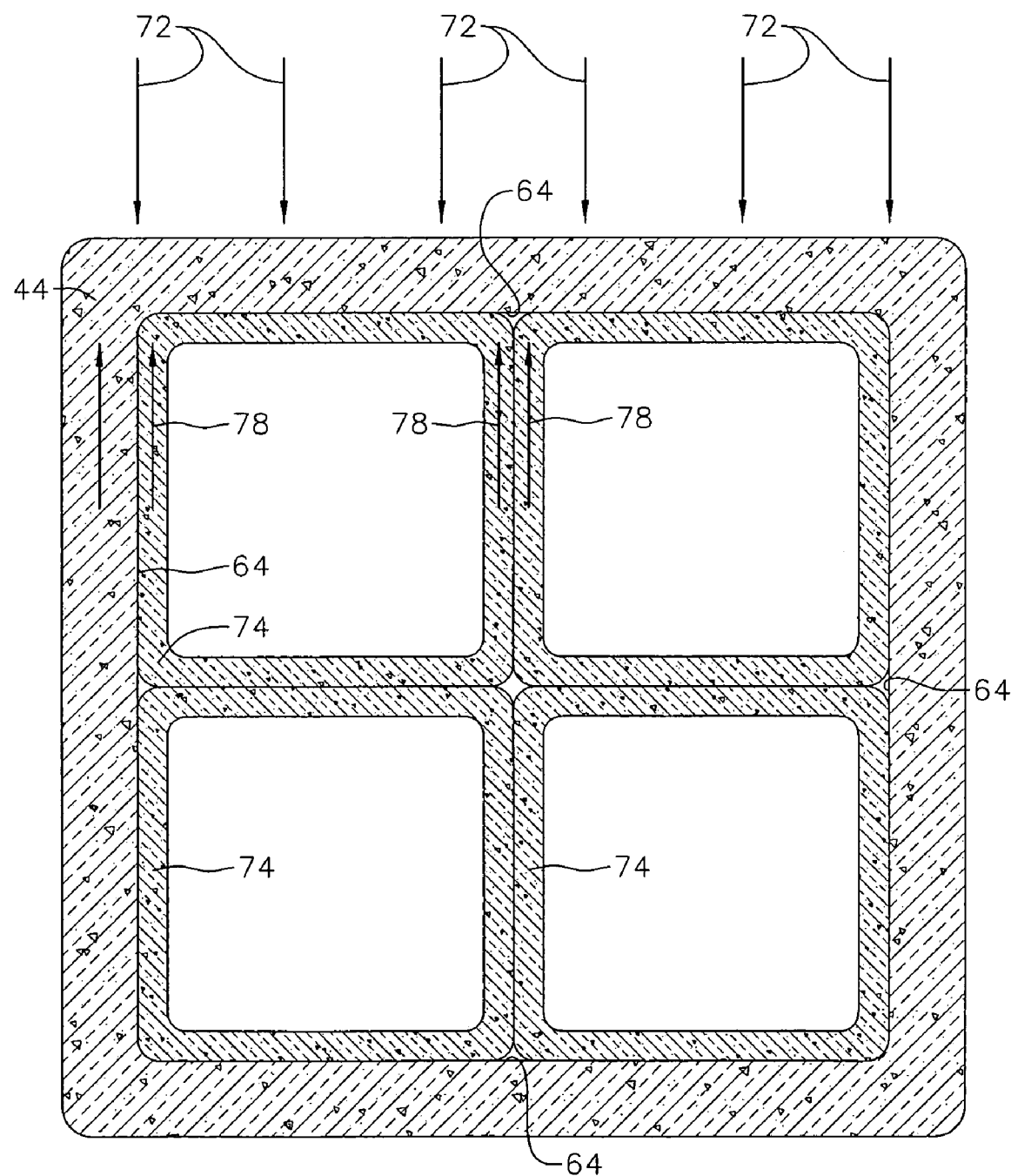
FIG. 11 is a transverse cross-section of a hollow device support having internal support structures.

A hollow composite structure can be strengthened by including one or more inserts in contact with an interior wall of the hollow structure. The insert can be formed from the same material as the composite structure or from a different material, for example a closed cell foam or a honeycomb plastic. The insert can be formed with the same shape or a different shape than the composite structure, and may take for example the shapes of the square and round inserts shown in FIGS. 11–13. In one example, the insert is round and contacts each side of the square composite structure in which it rests, or is a single square insert contacting the internal wall of the structure at the midpoints of the walls. In FIG. 11, the insert is a plurality of inserts that fill the interior of the hollow structure, and are preferably bonded to the adjacent surfaces of the hollow structure and of the adjacent inserts.

Figure 12:
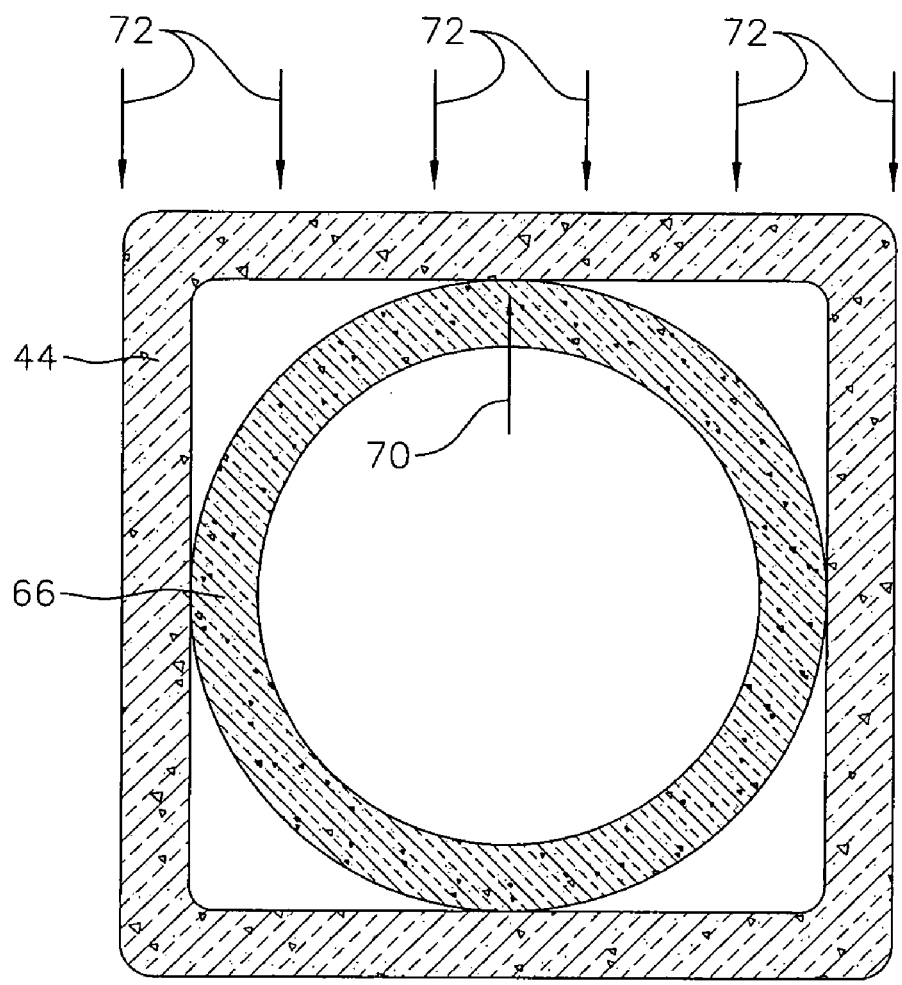
FIG. 12 is a transverse cross-section of a hollow device support similar to that of FIG. 11 having a circular internal support structure.
Figure 13:
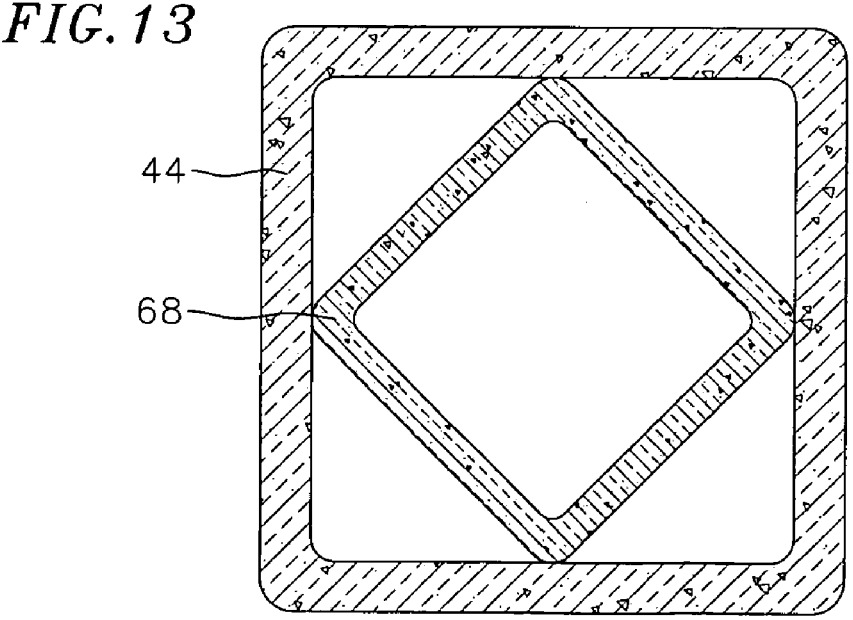
FIG. 13 is a transverse cross-section of a hollow device support similar to that of FIG. 11 having a single square internal support structure.

In one example of a hollow composite structure having supporting inserts, the composite column 44 includes any internal wall 64 defining a hollow interior of the composite column 44. The composite column is preferably hollow over the entire length of the column, and the wall of the column is preferably uniform in thickness so that the cross-sectional shape of the hollow portion is substantially the same as the outer shape of the composite column. In the example shown in FIGS. 4–6, a second structure contacts an inside surface of the composite column to provide additional load bearing support to the composite column. As depicted in FIGS. 12 and 13, the second structures 66 and 68, respectively, contact the inside surfaces of the adjacent composite column 44 at each of four relatively small areas approximately midway between each of the corners of the composite column. The second structures 66 and 68 provide additional support to the composite column in the direction of arrow 70 (FIG. 12) generally normal to the adjacent surface of the composite column, to help absorb, distribute or withstand loading that may be applied to the composite column. In the example depicted in FIG. 12, the support from the direction 70 helps to counteract the effects of loads 72 applied to the adjacent wall of the composite column. In the example of the drill column shown in FIGS. 1–6, the loading depicted by arrows 72 may come from the rollers 42 in the carriage 30. Additionally, where the second structures 66 and 68 are bonded with epoxy or other bonding agent (not shown) to the interior walls of the composite column, the second structures can also help to resist loading from other directions.

The composite column 44 preferably includes a plurality of second support structures, such as four hollow inserts 74 bonded to each other and to the inside adjacent surfaces 64 of the composite column 44 through epoxy 76 (FIGS. 4 and 6, not shown in FIG. 5) or another suitable bonding agent. The assembly is depicted schematically in FIG. 11, the four square hollow inserts 74 contacting the adjacent surfaces 64 of the composite column and the corresponding adjacent walls of the adjacent inserts through a bonding agent (not shown) such as epoxy. With this configuration, almost all of the inside surface 64 of the composite column is contacted by surfaces of the inserts through the epoxy.

In the configuration of the composite column and the inserts shown in FIG. 11, the inserts help to counteract loading 72. Counter forces are provided through the inserts 74 as represented schematically by the arrows 78 through the sides of the inserts contacting the adjacent wall 64 of the composite column. As shown in FIG. 11, the support provided by the plurality of square inserts 74 is somewhat different in character to that provided by the inserts 66 and 68, depicted in FIGS. 12 and 13, and the use of the plurality of square inserts may be preferred for larger interior components.

In the example of FIGS. 4–6, each insert 74 is preferably a hollow square tube formed as a composite of carbon fibers in a matrix similar to that used in the makeup of the composite column 44. The glass fiber layer can be omitted from the inserts, but each insert is preferably bonded to each of the adjacent structures through epoxy. The carbon fibers are wound and oriented in a manner selected according to the loads to be expected in the respective insert and the column. The composite column is approximately 4×4 inches square, and each tubular insert 74 is slightly less than one inch square so that four tubular inserts can fit within the hollow interior of the composite column.

As depicted in FIGS. 11–13, the sizes, shapes and configurations of the inserts can vary. The selection of the insert may depend on a number of factors, including the amount, concentration, direction or orientation of the loading to be expected. The selection of the inserts also depends on the internal configuration of the outer structure, which is square in the example of FIGS. 4–6. The shapes can be the same or different, the materials can be the same or different or the may have only a few common materials such as both having carbon fibers, the thicknesses can be the same or different, and the inserts can be positioned within the surrounding structure in a number of ways. However, the example of the drill column uses a square composite column with four square inserts bonded within the hollow area of the column.

The inserts preferably extend the length of the column not occupied by the top end plate 50, tube mount 80 or mounting bracket 90.

Figure 8:
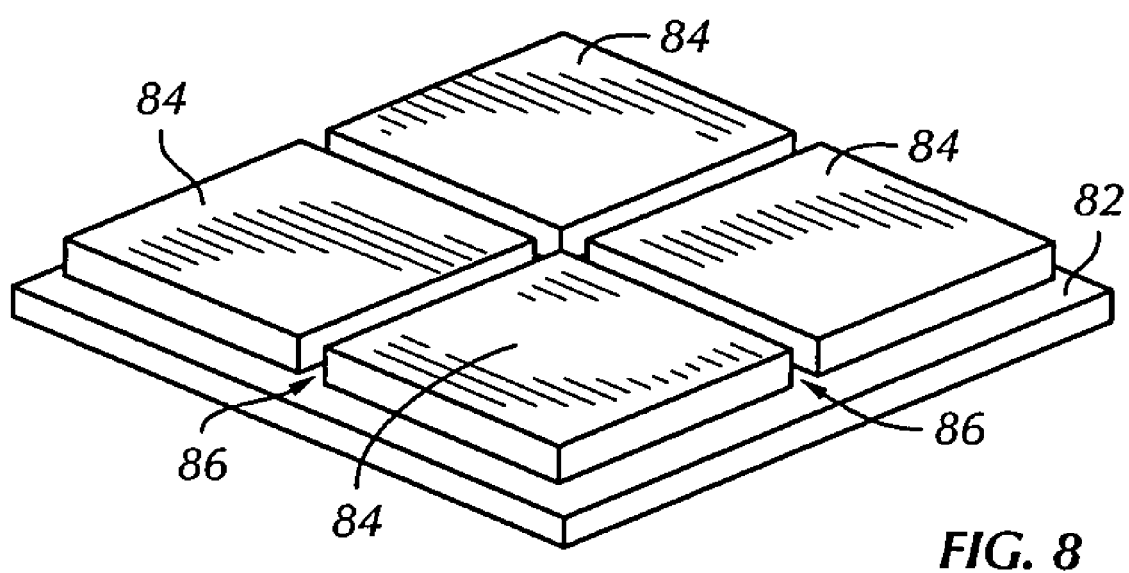
FIG. 8 is an upper isometric view of a lower support plate for used with the drill column of FIG. 1.

The inserts are supported within the composite column by an inner tube mount 80 in a lower end portion of the drill column. The tube mount 80 may take the form of a support plate 82 dimensioned to conform to the interior hollow portion of the composite column and includes a plurality of bosses or posts 84 (FIG. 8). Each post preferably conforms to the interior configuration of a respective insert so that the insert can extend around the respective post 84 and rest on the support plate 82. Each of the four inserts 74 extend around a respective post 84, and adjacent walls of the inserts fit in channels 86 formed between adjacent posts. Epoxy may be used between the tube mount 80 and the inserts as well as between the tube mount 80 and the composite column 44.

The bottom surface of the tube mount 80 includes a boss 88. The boss 88 conforms to the shape of a mounting bracket 90, and extends from the bottom surface of the tube mount 80 in board from the outer edges of the tube mount so that the tube mount rests on the mounting bracket 90. The tube mount is preferably formed from a suitable stainless-steel.

The mounting bracket 90 (FIGS. 5 and 9) is assembled from two side plates 92 and two side walls 94 into an approximately square bracket conforming to the inside dimensions of the hollow composite column 44. The side plates and side walls are fastened together with appropriate fasteners to support a pair of spacers 96, which receive bolts 28 to mount the column to the base 22 (FIG. 1). The mounting bracket 90 is positioned against the tube mount 80 and inside the composite column with the epoxy joining the mounting bracket to the tube mount and to the composite column. The bolts 28 pass through the bracket 26, and through the steel plates 40 and epoxy layers 62, and then through holes formed in the composite column. The bolts 28 then pass through the mounting bracket 90 and through the other side.

The mounting bracket 90 can also be formed from cast aluminum or other materials. The height of the mounting bracket 90 from the bottom of the composite column 44 may be varied, depending on the overall length of the column 24. For drill columns, common overall drill column lengths may be 42 inches or less, 60 inches, 72 inches or 80 inches, or more.

The metal parts such as the mounting bracket 90, the inner tube mount 80 and the top end plate 50 are preferably prepared so as to easily complement the surrounding surfaces and structures. The parts are preferably surface ground and formed from a suitable material, such as stainless-steel, or in the example of the mounting bracket 90 aluminum or other material. A braking mechanism can also be included that applies a linearly extended forced to the column to maintain the carriage in place, to replace conventional point braking mechanisms.

The composite column with the inserts, for example composite insert tubes, provide a lightweight and low-cost structure for supporting a drill or other tool. The assembly provides a strong structure. The column can be formed from one material and the inserts formed from another material or from the same material. Additionally, the column can take a number of shapes, including square, rectangular, hexagonal, octagonal as well as other shapes. Additionally, the shape of the column may depend on the expected loading forces to be experienced on the structure. For example, the loading forces from the carriage 30 may be different with two rollers on each side compared to four rollers on each side as described above, and the configuration of the reinforcing zones provided by inserts may also be influenced by the loading forces.

Figure 10:
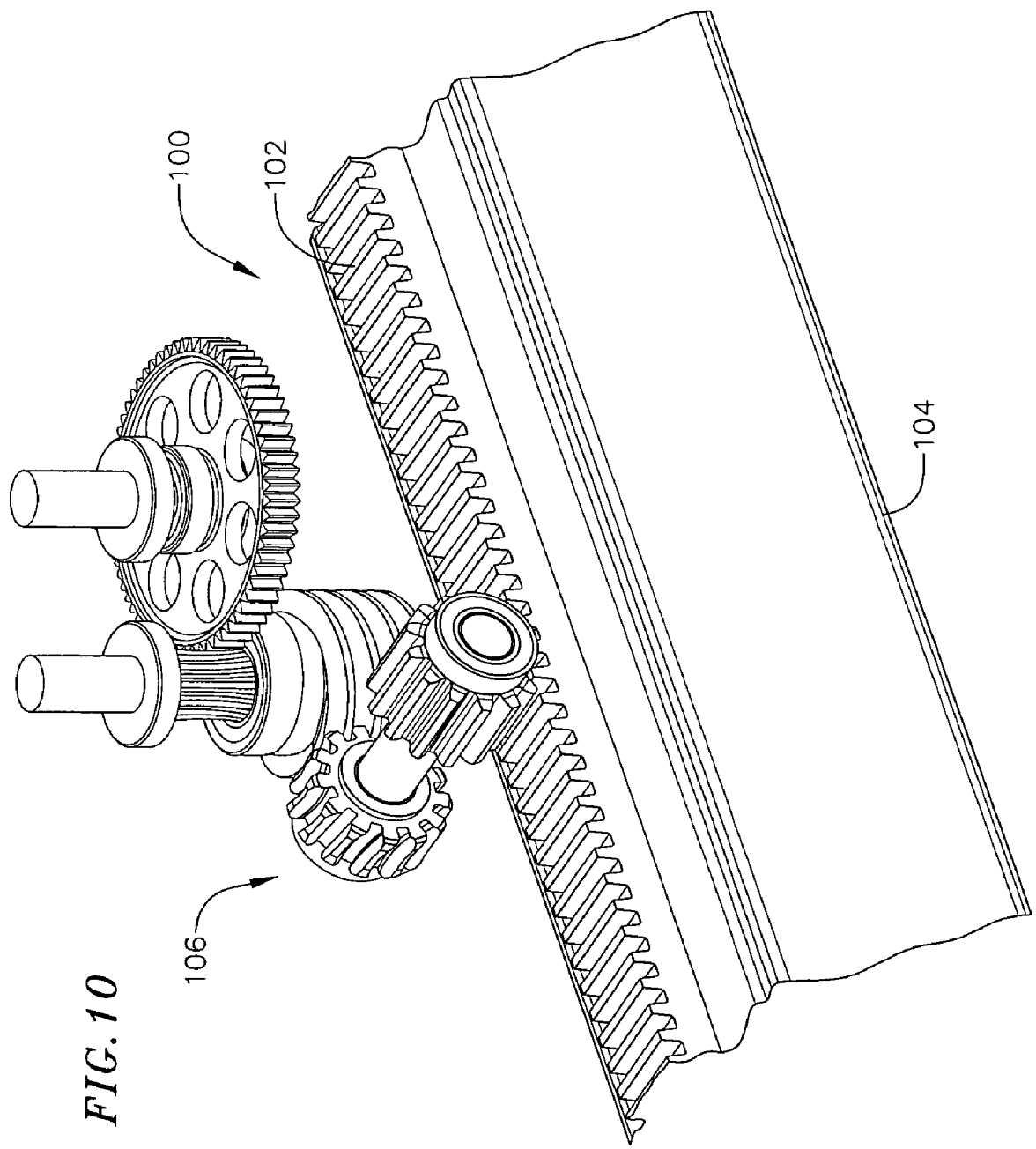
FIG. 10 is an upper side isometric view of a portion of a rail for use with a machining device and having a composite structure.
Figure 14:
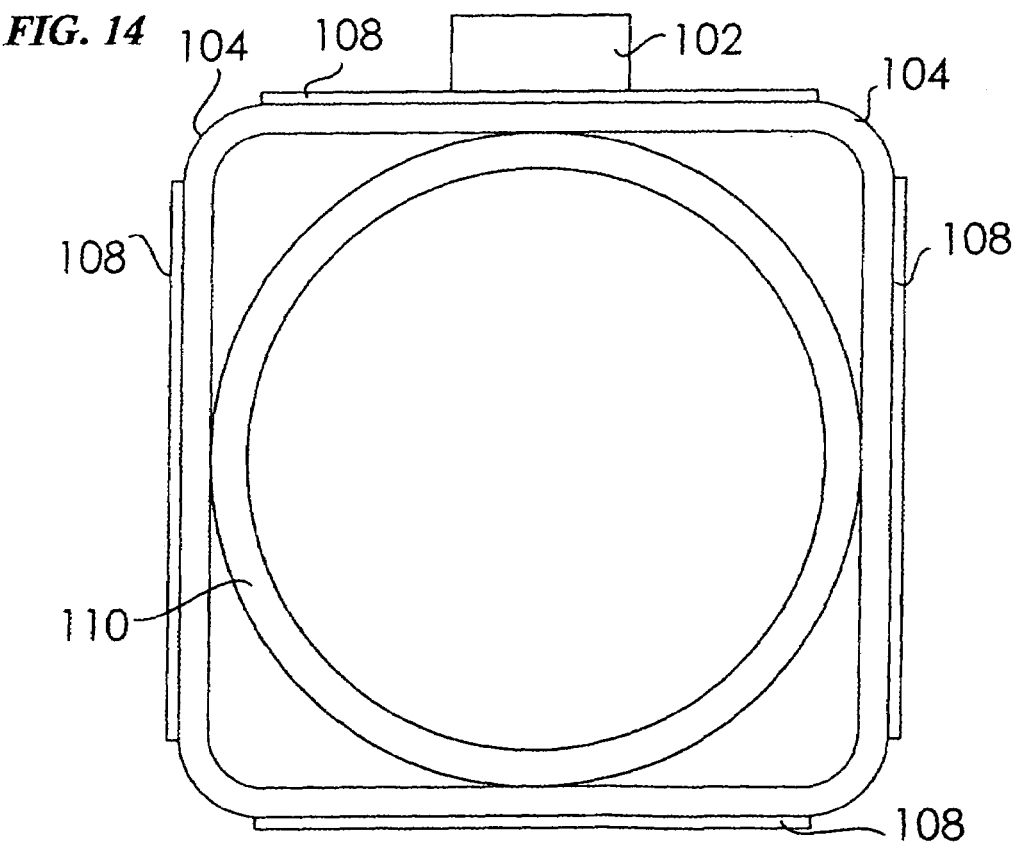

Another example of a component used in equipment for operating on work pieces includes tracks or rails such as that shown in FIGS. 10 and 14. A track 100 includes a rack 102 bonded to a square carbon fiber composite hollow tube 104, comprised of resin impregnated carbon fibers wound in layers at desired angles to withstand the expected loading on the track, and having approximately the same shape as the composite column 44 for the drill column. The track 100 is part of a wall saw (not shown) used for cutting concrete. One such saw is the model 360-2100S of Dimas USA, which travels on the track through engagement of drive gears 106 (FIG.) with the rack 102.

Wear plates 108 are mounted on the top, bottom and outer sides of the track to support rollers of the wall saw. The wear plates are preferably steel and bonded through epoxy to the sides of the track. The wear plates preferably extend the entire length of the track and extend width-wise sufficiently to support the rollers and distribute the load applied by the rollers of the wall saw. The track may also include one or more layers of glass fiber composite between the carbon fiber and the epoxy.

The track also includes a support material, shown in the example in FIG. 14 at 110, within the square hollow tube 104. The support material may be a closed cell foam, a honey comb material or a support insert such as inserts 66, 68 or 74 configured and oriented such as shown in FIGS. 11–13. The inserts can take other shapes and can be oriented in other ways than those shown in FIGS. 11–13, but these shapes and orientations are shown by way of example. As with the drill column example, the insert can also be formed from the same material as the composite hollow tube 104, and can have the same shape. In one example, the track is slightly less than 2×2 in. square, and a single insert may suffice to provide the desired support for the track 104. If the support material is a foam, it may be a closed cell foam having a 0.0056 pounds per cubic inch density.

Having thus described several exemplary implementations of the invention, it will be apparent that various alterations and modifications can be made without departing from the inventions or the concepts discussed herein. Such operations and modifications, though not expressly described above, are nonetheless intended and implied to be within the spirit and scope of the inventions. Accordingly, the foregoing description is intended to be illustrative only.

What is claimed is:

1. A drill assembly comprising:
   a support base;
   a drill support for supporting a drill; and
   a drill column supported by the base, supporting the drill support, and wherein the drill column is formed from a fiber composite material.

2. The drill assembly of claim 1 wherein the composite material of the drill column is formed from a combination of carbon fibers and a resin composition.

3. The drill assembly of claim 2 wherein the composite material further includes fiberglass fibers.

4. The drill assembly of claim 1 wherein the drill column extends longitudinally and includes a first surface and wherein the drill column further includes a plate on the first surface.

5. The drill assembly of claim 4 wherein the plate is a steel plate.

6. The drill assembly of claim 5 wherein the steel plate is bonded to the drill column.

7. The drill assembly of claim 5 wherein the column includes a plurality of sides and wherein more than one surface on the column includes a steel plate.

8. The drill assembly of claim 7 further including an engagement surface on one of the plates.

9. The drill assembly of claim 8 wherein the engagement surface is a rack.

10. The drill assembly of claim 9 further including a second rack on a second plate.

11. The drill assembly of claim 1 wherein the drill column has a rectangular cross-section.

12. The drill assembly of claim 11 wherein the drill column has a square cross-section.

13. The drill assembly of claim 11 further including a steel plate on each side of the drill column.

14. The drill assembly of claim 13 wherein the drill column is formed from a carbon fiber and resin composite and further including a fiber glass material between the steel plate and the carbon fiber.

15. A drill assembly comprising:
a support base;
a drill support for supporting a drill; and
a drill column supported by the base, supporting the drill support, and wherein the drill column is formed from a composite material and wherein the drill column includes a hollow portion and further including at least one insert within the hollow portion and at least a portion of the insert is bonded to the inside of the hollow portion.

16. The drill assembly of claim 15 wherein the drill column hollow portion has a first shape and the at least one insert has an external shape identical to the first shape.

17. The drill assembly of claim 16 wherein the hollow portion is square and the at least one insert outside shape is square.

18. The drill assembly of claim 17 further including four square inserts within the hollow portion.

19. A track for a wall saw, the track comprising a rail formed from a carbon fiber composite extending longitudinally and having first and second bearing surfaces for receiving and supporting respective transport components of a wall saw, having an internal wall defining a hollow portion of the rail and a support structure extending within the hollow portion of the rail and having a first wall portion extending along and contacting the internal wall of the rail.

20. The drill assembly of claim 15 wherein the drill column is formed from a first material and the at least one insert includes the first material.

21. The drill assembly of claim 20 wherein the drill column and the at least one insert all are formed from a composite carbon fiber material.

22. The drill assembly of claim 15 wherein the drill column is formed from first and second materials and the at least one insert does not include the second material.

23. The drill assembly of claim 22 wherein the second material is fiber glass.

24. A drill assembly comprising:
a support base;
a drill support for supporting a drill; and
a drill column supported by the base, supporting the drill support, wherein the drill column is formed from a composite material, wherein the drill column includes a hollow portion and further including at least one insert within the hollow portion wherein the hollow portion has a first shape and the insert has an outside shape different from the first shape.

25. The drill assembly of claim 24 wherein the first shape is square and the outside shape of the insert is round.

26. The drill assembly of claim 15 wherein the hollow portion has a first shape and the insert has an outside shape the same as the first shape and includes corners wherein at least one of the corners contacts an inside surface of the hollow portion.

27. The drill assembly of claim 15 wherein the hollow portion includes a surface and wherein part of the surface remains untouched by any insert.

28. A drill assembly comprising:
a support base;
a drill support for supporting a drill; and
a drill column supported by the base, supporting the drill support, wherein the drill column is formed from a composite material, wherein the drill column includes a hollow portion and further including at least one insert within the hollow portion and further including a bearing plate on an outside surface of the drill column and wherein the insert includes a surface contacting an inside surface of the hollow portion adjacent the bearing plate.

29. A drill assembly comprising:
a support base;
a drill support for supporting a drill; and
a drill column supported by the base, supporting the drill support, wherein the drill column is formed from a composite material, wherein the drill column includes a hollow portion and further including at least one insert within the hollow portion and further including a support plate within the hollow portion supporting the insert.

30. The drill assembly of claim 29 wherein the insert includes a hollow portion having a first shape and wherein the support plate includes a projection extending into the hollow portion of the insert.

31. The drill assembly of claim 30 wherein the drill column includes four inserts and wherein the support plate includes four projections extending into hollow portions of each of the four inserts.

32. The drill assembly of claim 30 further including a support base extending in the hollow portion and supporting the support plate.

33. The drill assembly of claim 32 wherein the support base is bonded to walls of the hollow portion.

34. A drill assembly comprising:
a support base;
a drill support for supporting a drill; and
a drill column supported by the base, supporting the drill support, wherein the drill column is formed from a composite material, wherein the drill column includes a hollow portion and further including at least one insert within the hollow portion and further including a cap portion having at least one wall extending within a hollow portion of the column.

35. The drill assembly of claim 34 further including a bonding layer between the at least one wall and the hollow portion of the column.

36. The drill assembly of claim 34 further including a jack screw threaded into the cap portion.

37. The drill assembly of claim 34 wherein the cap portion includes a lip portion extending over an end portion of the drill column.

38. The drill assembly of claim 34 wherein the cap portion covers a first end of the drill column and further including a support base at a second end of the drill column and wherein the at least one insert extends substantially the distance from the cap portion and the support base.

39. The drill assembly of claim 38 wherein the support base has a shape conforming to the shape of the hollow portion within which the support base extends.

40. A composite support structure comprising:
a first structure extending longitudinally about a straight axis and including an outside surface and an inside surface defining a hollow portion extending at least partly along the structure, wherein the first structure is formed from a fiber reinforced material;
a second structure extending longitudinally within the hollow portion and contacting at least a portion of the inside surface and wherein the second structure is configured in such a way as to contact a portion of the hollow portion inside surface, wherein the second structure is formed from a fiber reinforced material; and
a bearing plate on an outside surface of the first structure on a portion of the outside surface adjacent the second structure where the second structure contacts the portion of the inside surface of the first structure.

41. The composite structure of claim 40 wherein the bearing plate includes a steel plate bonded to the first structure.

42. The composite structure of claim 40 wherein the fiber reinforced material of the first structure is a carbon fiber reinforced material.

43. The composite structure of claim 42 wherein the fiber reinforced material of the second structure is a carbon fiber reinforced material.

44. The composite structure of claim 42 wherein the second structure extends a substantial length of the first structure.

45. The composite structure of claim 40 wherein the fiber reinforced material of the first structure is substantially the same as the fiber reinforced material of the second structure.

46. The composite structure of claim 40 wherein the first structure has a first shape and wherein the second structure has a shape that is substantially the same as the first shape.

47. The composite structure of claim 40 wherein the first structure has a first shape and wherein the second structure has a shape that is substantially different than the first shape.

48. The composite structure of claim 40 wherein substantially all of the inside surface defining the hollow portion is contacted by a surface of one of the second structure and other structures.

49. The composite structure of claim 48 wherein the second structure and the other structures have the same shape.

50. The composite structure of claim 40 wherein the second structure has an outer surface and wherein less than all of the outer surface of the second structure contacts the inside surface of the first structure.

51. The track of claim 19 further including a wear plate bonded to respective ones of the first and second bearing surfaces, wherein the internal wall defining the hollow portion of the rail includes first and second surfaces adjacent the first and second bearing surfaces, respectively, and wherein the first wall portion of the support structure contacts the first surface adjacent the first bearing surface, and a second wall portion of the support structure contacts the second surface adjacent the second bearing surface, and wherein the support structure is formed from a carbon fiber.

52. The track of claim 19 further including a rack bonded to the rail.

53. The track of claim 19 further including at least one wear plate on the first bearing surface.

54. The track of claim 53 wherein the wear plate is bonded to the bearing surface.

* * * * *

UNITED STATES PATENT AND TRADEMARK OFFICE
CERTIFICATE OF CORRECTION

| | | |
|---|---|---|
| PATENT NO. | : 7,214,007 B2 | Page 1 of 1 |
| APPLICATION NO. | : 10/358072 | |
| DATED | : May 8, 2007 | |
| INVENTOR(S) | : Anthony Baratta | |

It is certified that error appears in the above-identified patent and that said Letters Patent is hereby corrected as shown below:

Column 3, after line 50, insert a new paragraph as follows:

FIG. 14 is an end view of the track of FIG. 10.

Column 8, line 15, please change the text to read as follows:

(FIG. 10) with the rack 102.

Signed and Sealed this

Sixth Day of May, 2008

JON W. DUDAS
*Director of the United States Patent and Trademark Office*